US008862818B1

(12) United States Patent
Ozdemir (10) Patent No.: US 8,862,818 B1
(45) Date of Patent: Oct. 14, 2014

(54) HANDLING PARTIAL STRIPE WRITES IN LOG-STRUCTURED STORAGE

(71) Applicant: Kadir Ozdemir, San Jose, CA (US)

(72) Inventor: Kadir Ozdemir, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 195 days.

(21) Appl. No.: 13/629,375

(22) Filed: Sep. 27, 2012

(51) Int. Cl.
*G06F 12/00* (2006.01)
*G06F 3/06* (2006.01)
*G06F 11/10* (2006.01)

(52) U.S. Cl.
CPC .......... *G06F 3/0689* (2013.01); *G06F 11/1076* (2013.01)
USPC ........................................................ 711/114

(58) Field of Classification Search
None
See application file for complete search history.

(56) References Cited

U.S. PATENT DOCUMENTS

| 5,537,534 | A * | 7/1996 | Voigt et al. ..................... 714/6.21 |
| 8,417,877 | B2 * | 4/2013 | Brandt ........................... 711/103 |
| 2010/0030960 | A1 * | 2/2010 | Kamalavannan et al. ..... 711/114 |
| 2012/0054413 | A1 * | 3/2012 | Brandt ........................... 711/103 |
| 2013/0339580 | A1 * | 12/2013 | Brandt ........................... 711/103 |

* cited by examiner

*Primary Examiner* — Kevin Verbrugge
(74) *Attorney, Agent, or Firm* — Blakely, Sokoloff, Taylor & Zafman, LLP (57) ABSTRACT

A system and method for writing data a series of partial stripe writes to a redundant array of independent disks (RAID) with parity system. In one embodiment, the RAID with parity system is implemented as a log-structured storage system. In the RAID with parity system, each of the partial stripe writes can be issued before the active stripe is fully written. To buffer each partial stripe write, some data from each partial stripe write can be written to a scratch stripe before being written to the active stripe so that only writes of a predetermined size are issued to the active stripe. Other embodiments are also described herein.

15 Claims, 7 Drawing Sheets

HANDLING PARTIAL STRIPE WRITES IN LOG-STRUCTURED STORAGE

FIELD OF INVENTION

Embodiments of the present invention relate generally to data storage systems. More particularly, embodiments of the invention relate to log-structured storage systems employing a redundant array of independent disks.

BACKGROUND

In modern computer systems, a redundant array of independent disks (RAID) is a system to store data across multiple disk drives that are combined into a single logical unit. Data to be stored in the RAID system is distributed across these multiple disk drives according to a particular level that is employed, such as data replication or data division. The standard RAID levels are zero (0) through six (6). Standard RAID levels two (2) through six (6) use a particular error protection scheme implemented through parity. RAID levels 2 through 5 feature a single parity, whereas RAID 6 features two separate parities.

A RAID storage system can be implemented as a log-structured system. In a log-structured storage system, existing and valid data on disk is not overwritten; rather, new data is written to a new location each time. A log-structured system accomplishes this by treating a disk as a single "log" and appending data to the end of the log. Free space is managed on the disk by "cleaning"—that is, recovering out-of-date portions of the log.

In a log-structured RAID storage system, read-modify-write disk operations may require only a partial stripe. Such cases incur additional overhead because the data and parity information from the disk must be read, modified and written back to disk to complete the write operation. Furthermore, partial stripe writes often lead to data corruption during system failures because data and parity update operations can be interrupted in unpredictable ways. One common solution is to buffer changes to a given stripe on non-volatile memory (e.g., non-volatile random access memory such as battery backed random access memory (RAM) and flash memory) before issuing a partial stripe write operation. However, using non-volatile memory increases the cost to the system and complicates the design, particularly in the case of highly available systems. Additionally, non-volatile memory does not necessarily ensure reliability and data integrity.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

Figure 1:
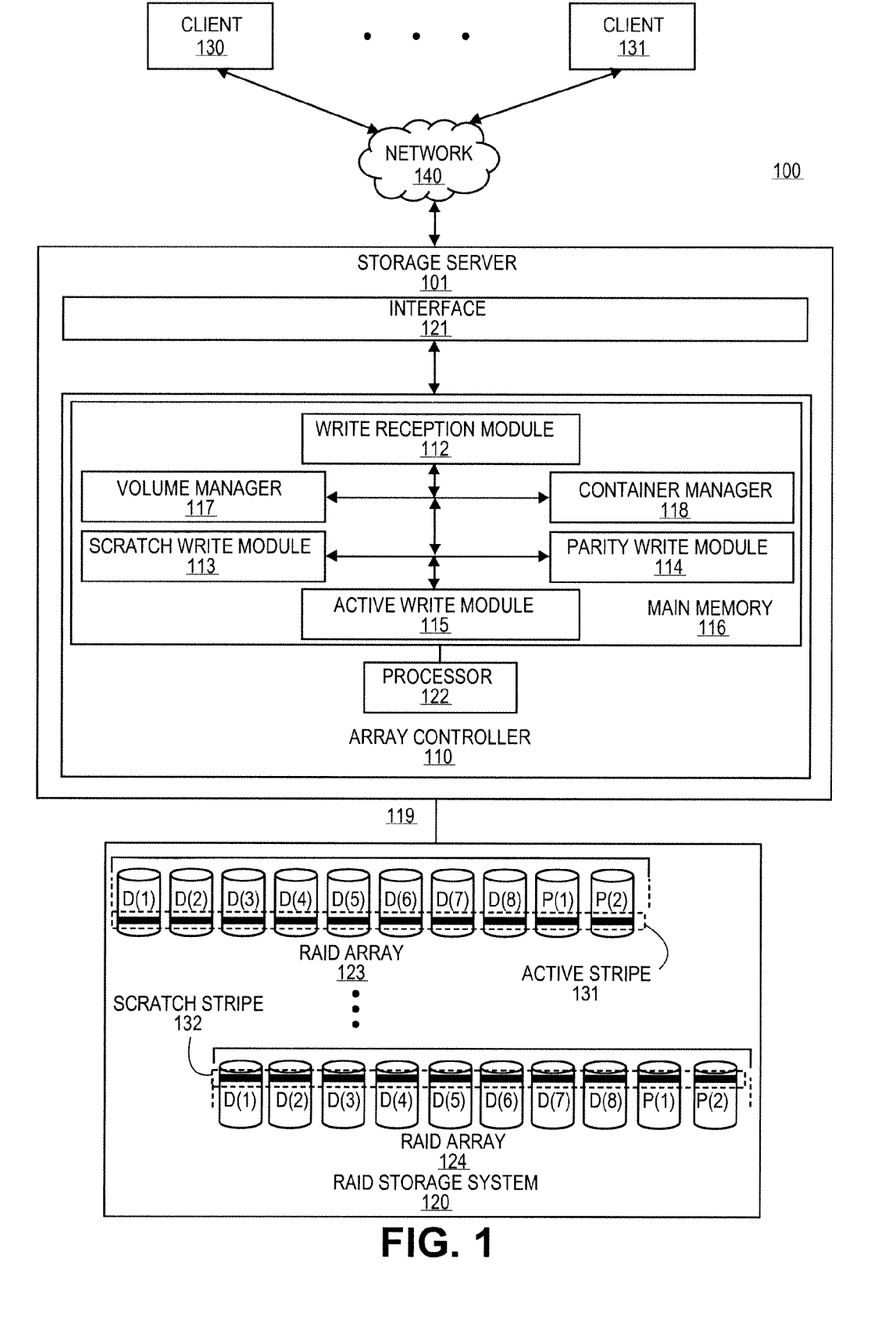
FIG. 1 is a block diagram of one embodiment of a log-structured RAID storage system.

Beginning first with FIG. 1, a block diagram is shown illustrating a storage system according to one embodiment of the invention. Referring to FIG. 1, system 100 includes, but is not limited to, one or more client systems 130-131 communicatively coupled to a storage server 101 over network 140. Clients 130-131 can be any type of clients such as a server, a personal computer (e.g., desktops, laptops, and tablets), a "thin" client, a personal digital assistant (PDA), a Web-enabled appliance, a gaming device, a media player, or a mobile phone (e.g., Smartphone), etc. Network 140 can be any type of network such as a local area network (LAN), a wide area network (WAN) such as the Internet, a corporate intranet, a metropolitan area network (MAN), a storage area network (SAN), a bus, or a combination thereof, wired and/or wireless.

Storage server 101 can include any type of server or cluster of servers. For example, storage server 101 can be a storage server used for any of various different purposes, such as to provide multiple users with access to shared data and/or to back up mission-critical data. Storage server 101 can have a distributed architecture, or all of its components can be integrated into a single unit. Storage server 101 can be implemented as part of an archive and/or backup system such as a storage system available from EMC® Corporation of Hopkinton, Mass.

In one embodiment, storage server 101 includes, but is not limited to: interface 121 and array controller 110. Interface 121 can accept data across network 140 from clients 130-131 to be stored at RAID storage system 120. Interface 121 is communicatively coupled to array controller 110 which organizes and manages data storage at RAID storage system 120. Array controller 110 is adapted to organize and manage data across RAID storage system 120 and can be implemented as either hardware or software. Array controller 110 includes, but is not limited to, several components: processor 122 and main 116 including write reception module 112, scratch write module 113, parity write module 114 and active write module 115 as well as volume manager 117 and container manager 118. In some embodiments, data accepted across network 140 and received at interface 121 is the processed at container manager 118. Container manager 118 can be adapted to initiate the storage of the data at, for example, RAID storage system 120.

Communicatively coupled with storage server 101 is Redundant Array of Inexpensive Disks (RAID) storage system 120. Storage server 101 is coupled with RAID storage system 120 via an interconnect 119, which can be a bus or a network. Thus, RAID storage system 120 can be either locally or remotely located to storage server 101. RAID storage system 120 includes RAID arrays 123-124, which can be log-structured. However, in one embodiment RAID storage system 120 includes only a single RAID array 123. Each of RAID arrays 123-124 is arranged across volumes D(1)-P(2). These volumes can be physical drives (e.g., each of D(1)-P(2) is separated as a physical disk drive) or the volumes can be logically separated by volume manager 117.

In embodiments wherein storage systems employing RAID arrays 123-124 are log-structured, partial stripe writes are sequentially written to a log wherein each individual RAID array functions as the log storage. Alternatively, volume manager 117 can control RAID arrays 123-124 so that all RAID arrays 123-124 of RAID storage system 120 function as one log storage. The log is comprised of fixed-size containers. Container manager 118 can control the size of the containers and implement the containers (e.g., through garbage collection and otherwise maintaining free and used containers). Typically, the container size is consistent with a stripe size in the RAID array, and therefore each stripe contains exactly one container or a container amounts to an integral number of stripes—for example, a Data Domain file system distributed by EMC® Corporation features a log having four and one half (4.5) megabyte (MB) containers. For simplicity, this Specification assumes a container size of one stripe; consequently, in referencing one stripe, reference to one container is inherent, and vice versa.

In a physical implementation of the log-structured RAID storage system, free space in the log is reclaimed by container manager 118 from the tail of the log to prevent the system from becoming full when the head of the log wraps around to meet it. The container manager 118 can release space at the tail of the log and move forward by skipping over older versions of data to retain only the latest versions of data existing further ahead in the log. For the latest version of data, this data can be appended to the head of the log by container manager 118 to free up space near the tail of the log.

In a logical implementation of the log-structured RAID storage system, an infinite logical log is constructed such that the head of the log never wraps around to meet the tail (as it does in the physical implementation). Instead, a mapping from logical log entries to the physical containers of the log is maintained by, for example, container manager 118. Consequently, an unused container (e.g., a container not having the latest version of data) is freed regardless of its physical location on disk. Free containers are then logically appended to the head of the logical log to be reused immediately.

RAID arrays 123-124 can be conventional magnetic disks, optical disks such as CD-ROM or DVD based storage, magnetic tape storage, magneto-optical (MO) storage media, solid state disks, or any other type of non-volatile storage devices suitable for storing large volumes of data. RAID arrays 123-124 are not necessarily of the same storage type. In the preferred embodiment, RAID arrays 123-124 include parity that is dedicated to at least one drive of a RAID array. For example, RAID array 123 includes two drives dedicated to parity: P(1) and P(2). Similarly, RAID array 124 includes two parity drives P(1) and P(2). Consequently, RAID arrays 123-124 have sufficient data drives and parity drives to operate at a RAID 6 level.

In RAID storage system 120, a RAID array can have an active stripe which is a stripe that is actively having partial stripe writes written to it. Here, active stripe 131 is shown as allocated across the units of RAID array 123. In one embodiment, container manager 118 allocates an active container (not shown) to receive a series of partial stripe writes and volume manager 117 maps the allocated container to the active stripe 131 at RAID array 123. This active stripe can be partially written by a previous series of partial stripe writes that did not fill the active stripe. Similarly, a unit of the active stripe (i.e., the area of each drive in the RAID array corresponding to the active stripe) that is partially written, or is to receive a partial stripe write, is called the active unit. And a stripe unit that is fully written on disk is a sealed unit. An active stripe can be fully written when each unit of the active stripe is fully written, including the parity unit(s), at which point the stripe becomes a sealed stripe and the next active stripe is allocated.

According to an embodiment of the invention, each active stripe in the RAID array can have a scratch stripe paired with it. A scratch stripe is not a regular stripe such that it does not have its own parity stripe unit(s). It is used as a scratch pad to buffer active units until they are sealed. Here, active stripe 131 is shown as being paired with scratch stripe 132. In one embodiment, container manager 118 allocates a scratch container (not shown) to pair with the active container (not shown) and volume manager 117 maps the allocated scratch container to the scratch stripe 132 at RAID array 124. Although FIG. 1 depicts active stripe 131 and scratch stripe 132 in separate RAID arrays 123 and 124, respectively, scratch stripe 132 can be allocated from the same RAID array as the active stripe with which it is paired (i.e., RAID array 123). Scratch stripe 132 can be used to buffer the data to be written to the active unit of active stripe 131. Consequently, parity data for active stripe 131 is buffered on scratch stripe 132 because a parity unit(s) is active until the active stripe is fully written.

Turning back to storage server 101, modules 112-115 are each adapted to program processor 122 to perform specific operations at array controller 110, some of which are described herein. To begin with, write reception module 112 receives a series of partial stripe writes to be written to a RAID array in the RAID storage system 120 managed by the array controller 110. The series of partial stripe writes can be simultaneously or incrementally received at interface 121 from clients 130-131 across network 140. A series of partial stripe writes are written to an active stripe in a RAID array of RAID storage system 120 (e.g., active stripe 131). In one embodiment, container manager 118 allocates the active container in the log-structured RAID storage system 120 for the series of partial stripe writes received by the write reception module 112. Container manager 118 can also allocate the scratch container to buffer partial stripe writes for the active container. In one embodiment, container manager 118 receives the series of partial write stripes before the series is subsequently passed to write reception module 112. Write reception module 112 can process the partial stripe writes in the series by, for example, assembling metadata to be written with each partial stripe write.

To realize the on-disk implementation of the active and scratch containers in the RAID array, container manager 118 is adapted to allocate a scratch stripe in the RAID array (e.g., scratch stripe 132 of RAID array 124) and pair the scratch stripe with the current active stripe (e.g., active stripe 131 of RAID array 123). To bridge the gap between the log-structured storage and the RAID array implementation, volume manager 117 can map the active and scratch containers to the active stripe and the scratch stripe allocated by the container manager 118, respectively. Data from interface 121 can be received at container manager 118 through write reception module 112 and then passed to volume manager 117 by container manager 118. Alternatively, data from interface 121 can be received at write reception module 112 and then passed to container manager 118 for on-disk implementation through volume manager 117.

Communicatively coupled with write reception module 112 and container manager 118 is scratch write module 113. Scratch write module 113 is adapted to write data that does not seal the active unit of active stripe 131 to the scratch stripe 132 allocated by container manager 118.

Active write module 113 is adapted to write data directly to the active stripe 131. This data can be a version of the active unit at the scratch stripe 132 or data directly from a partial stripe write received at write reception module 112. To improve I/O efficiency of system 100, data of a partial stripe write that is sufficient to seal a unit of the active stripe 131 is written directly to the active stripe 131 without first being written to the allocated scratch stripe 132. In this case, active write module 113 maintains in memory the most recent version of the currently active units (one data stripe unite and the parity stripe unit(s)). In situations wherein there is no data to be written to the active unit at the allocated scratch stripe 132, active write module 113 is adapted to write data from a partial stripe write directly to the active unit of the active stripe 131 where that data is sufficient to seal the active unit. In this way, active write module 113 can repeatedly write data from a single partial stripe write to a number of sequential units in the active stripe 131. The remainder data from the partial stripe write (i.e., data not written to the active stripe 131 that is insufficient to seal a unit) is written to the scratch stripe 132. Where there is a valid version of the active unit at the allocated scratch stripe 132, active write module 113 is adapted to prepend that data to the data from a current partial stripe write and write the aggregated data to the active stripe (again, where the aggregated data is sufficient to seal the active unit).

To recover from disk failure or other write abnormalities, array controller 110 includes parity write module 113. As described above, parity data for the active stripe is contained at the scratch stripe because a parity unit(s) is active until the active stripe is fully written. Consequently, parity write module 113 is adapted to write parity data to one of the active stripe and the scratch stripe. Parity write module 114 writes parity data for the active stripe 131 to the corresponding scratch stripe 132. When all the data units of the active stripe 131 are fully written, then parity write module 114 can write parity data for the active stripe 131 to the parity unit(s) of the active stripe (thus sealing the active stripe). However, there are some scenarios (described herein) in which parity data for active stripe 131 must be first written at the scratch stripe 132 before being written to the active stripe 131 even where each data unit of the active stripe is fully written.

For recovery purposes, data written for a partial stripe write may need to be self-describing. This self-description can be achieved by writing data together with metadata for each write. The metadata can be prepended or appended for each write. For example, every stripe unit can include a header structure to maintain metadata for the stripe unit. This metadata can comprise a tuple. In one embodiment, a six-tuple describes a unit: (1) Stipe type, (2) Stripe identification, (3) Stripe unit type, (4) Stripe unit order, (5) Stripe unit length, and (6) Active stripe unit version. The stripe type can be regular (R) or scratch (S). The stripe identification is a monotonically increasing unique identifier assigned when a stripe is written so that each version of a given stripe is assigned a new ID. The stripe unit type can be data (D) or parity (P). The stripe unit order is the order of the stripe unit in the stripe. The stripe unit length is the number of valid bytes in the stripe unit, excluding bytes in the header structure. For active parity stripe units, the stripe unit length is the size of the data that has been written to the active stripe thus far. Finally, the active stripe version is the version of the active stripe unit (e.g., one for the first version, two for the second version, etc.). The active stripe version is set to zero for sealed stripe units. Note that metadata for the entire content stored in a stripe can be placed at the end of the stripe in order to write the final form of metadata once.

Figure 2:
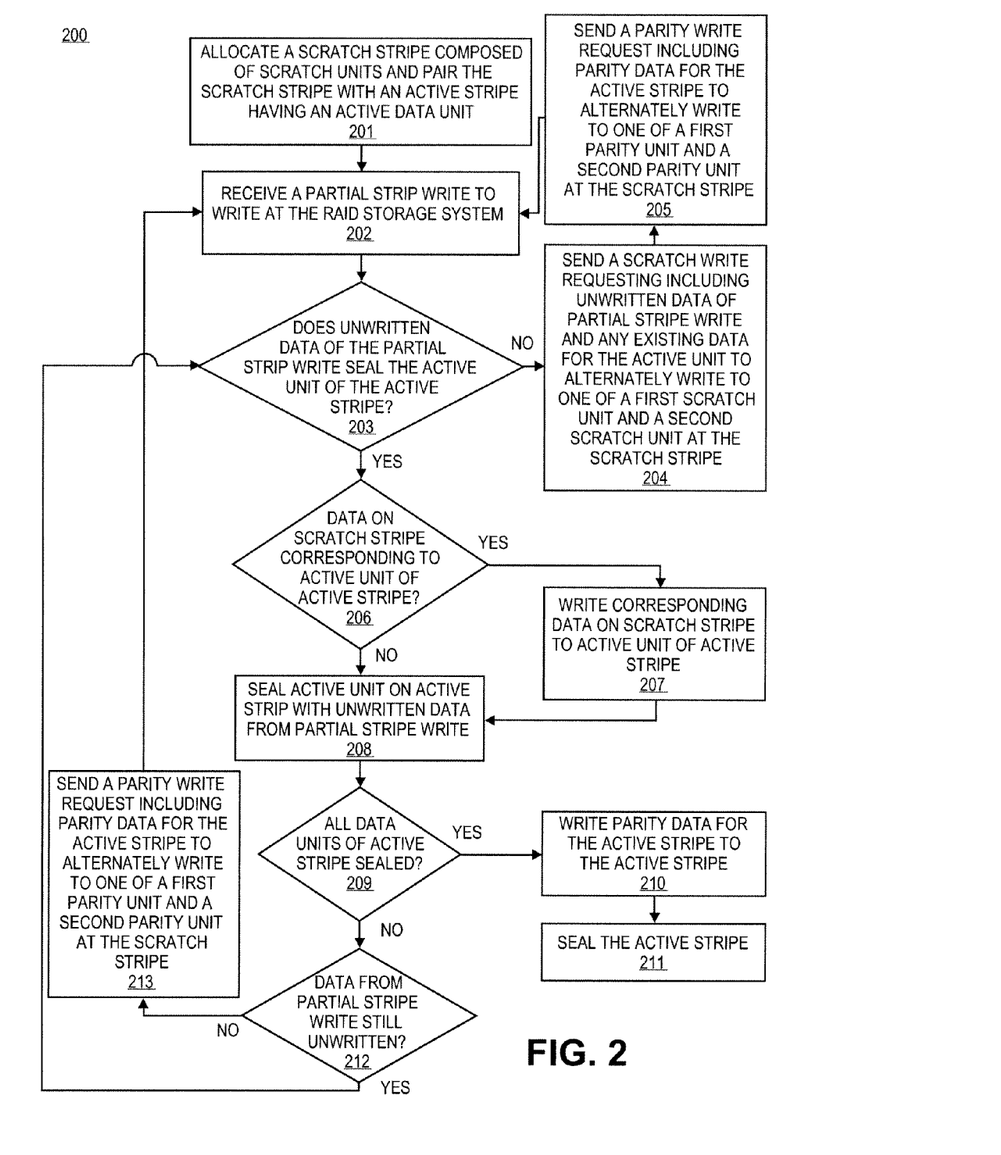
FIG. 2 is a flowchart of one embodiment illustrating a method for handling partial stripe writes in a log-structured storage system.

FIG. 2 shows a flow diagram illustrating one embodiment of a method for performing the invention. Method 200 can be performed by, for example, array controller 110 of FIG. 1 coupled with RAID storage system 120. Method 200 begins at operation 201 where a scratch stripe is allocated and paired with the active stripe. The active stripe can be selected by a volume manager as the on-disk stripe corresponding to an active container allocated by a container manager for managing a log-structured file system. Similarly, the scratch stripe can be selected by a volume manager as the on-disk stripe corresponding to a scratch container allocated by the container manager. The volume manager can then pair the allocated active stripe with the allocated scratch stripe.

Having an allocated active stripe and corresponding scratch stripe, method 200 proceeds to operation 202. At operation 202, a partial stripe write to be written to the allocated active stripe of a RAID storage system is received. This partial stripe write can be received as one of a series of partial stripe writes. In one embodiment, operations 201 and 202 are transposed. Thus, the scratch stripe is allocated and/or paired with the active stripe after the partial stripe write or series of partial stripe writes is received.

At decision block 203, method 200 evaluates whether the existing data at the received partial stripe write is sufficient to seal the active unit of the active stripe. The active unit is sealed when the quantity of data to be written to the active unit is approximately equal to the size of the active unit. Once a unit is sealed it is no longer active, and the next unit in the RAID array becomes the active unit. This sufficiency determination is made in one of two ways: (1) the scratch stripe contains scratch data for the active unit (i.e., a version of the active unit) and the unwritten data from the current partial stripe are sufficient in the aggregate to fully write the active unit; (2) where the scratch stripe does not contain scratch data for the active unit, the unwritten data from the current partial stripe write fully writes the active unit. For a first partial stripe write, decision block 203 bases this evaluation on the amount of unwritten data at the first partial stripe write.

Where decision block 203 determines the data to be written by the partial stripe write is insufficient to seal the active unit of the active stripe, the method reaches operation 204. At operation 204, the existing data for the active unit and the data remaining at the partial stripe write to be written to the RAID storage system (i.e., unwritten data) is written to one of two scratch data units at the scratch stripe. As may be the case for all writes performed by method 200, this write can be accomplished by sending a write request to the RAID storage system. The unwritten data is written in an alternating fashion—that is, the unwritten data is written to the obsolete one of the two scratch units at the scratch stripe. For a first partial stripe write at operation 204, the unwritten data is simply written to a first one of the two scratch units. Where there is a latest version of the active unit (e.g., a first version) at one of the scratch units of the scratch stripe, method 200 appends data from the current partial stripe write to data from the latest version of the active unit and writes the aggregated data to the other of the two scratch units at the scratch stripe. This aggregated data becomes the latest version of the active unit, while maintaining the previous version for recovery purposes.

Figure 4A:
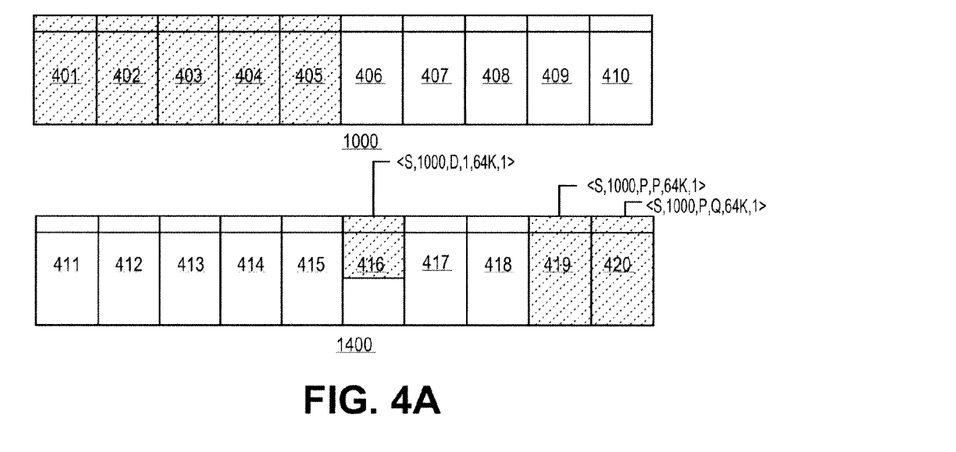
FIGS. 4A-4C are block diagrams illustrating one example of an embodiment of a method for handling partial stripe writes in a log-structured storage system.
Figure 4B:
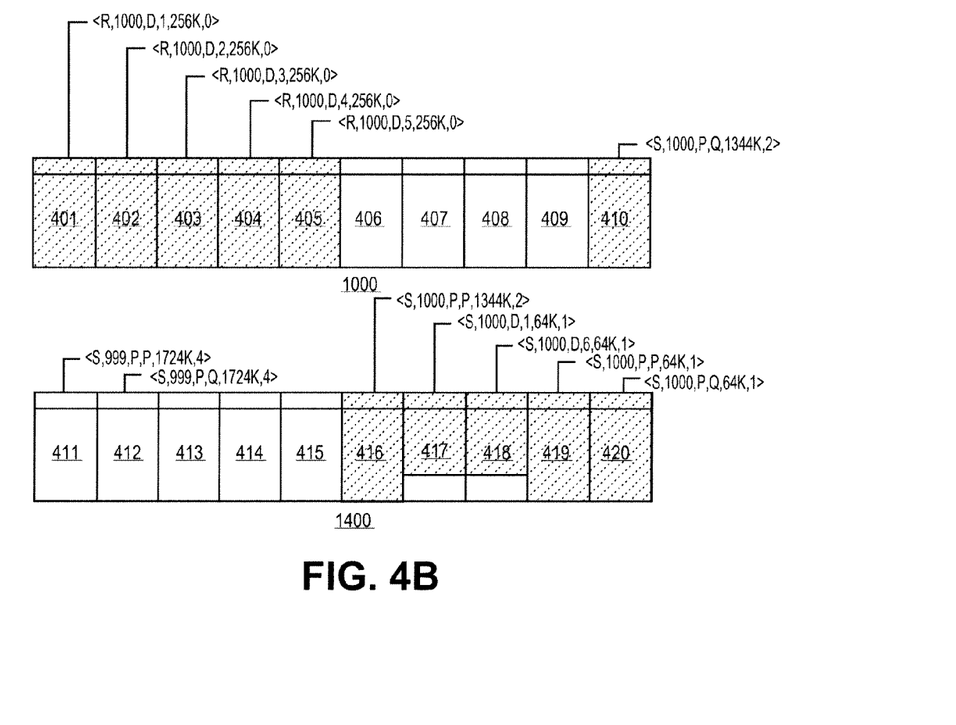
Figure 4C:
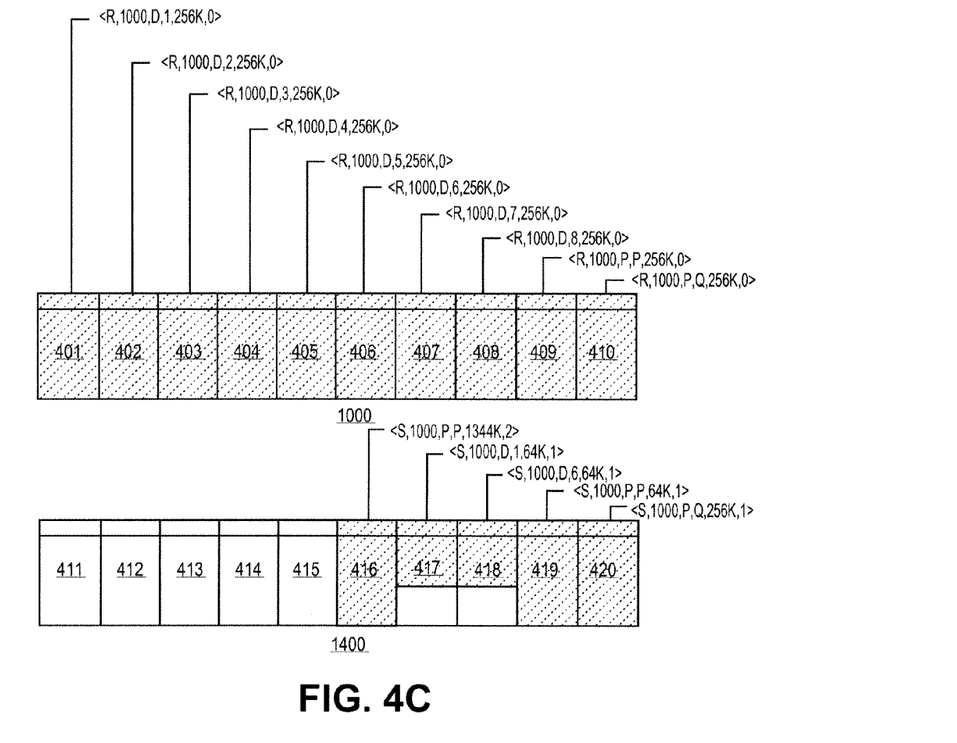

With the actual data written to the scratch stripe, method 200 writes parity data for the active stripe to one of two allocated parity locations at the scratch stripe at operation 205. The parity locations are dictated by the RAID level—e.g., the parity locations of a RAID 6 system are two units each, whereas the parity locations of a RAID 5 system are a single unit each. In a first visit to operation 205, the calculated parity is simply written to a first one of the two parity locations at the scratch stripe. In one embodiment, operations 204 and 205 are performed in parallel, thus the parity(s) is written in parallel with the data from the partial stripe write. In an embodiment wherein the active stripe and scratch stripe are allocated from the same RAID array, parity(s) for the active stripe can be written to the active stripe if the scratch stripe cannot accommodate the parity. The parity can be identified as scratch parity by metadata associated with the parity (e.g., a tuple value indicating the parity is scratch parity). An example of this embodiment is shown at FIGS. 4A-4C. With parity written for the data, method 200 returns to operation 202 for a next partial stripe write.

Where decision block 203 determines that the quantity of unwritten data from the current partial stripe write is sufficient to seal the active unit, decision block 203 advances to decision block 206. Decision block 206 determines whether the scratch stripe contains corresponding data for the active unit. At an initial decision block 206, the scratch stripe is empty. Thus, decision block 206 proceeds to operation 208. Where the scratch stripe contains data for the active unit (e.g., from a previous stripe write), method 200 reaches operation 207. In one embodiment, metadata at a scratch stripe unit indicates that the scratch stripe unit is a version of the active unit. For example, the scratch stripe unit can have a six-tuple: <S, 999, D, 4, 64, 2>. This illustrative tuple indicates that this is a scratch unit allocated for the regular stripe identified as 999 that contains 64 kilobytes (KB) of data for the forth unit of stripe 999 and it is the second version. Where the second version is the latest version, and the forth unit is the active unit of active stripe 999, then decision block 206 advances to operation 207. At operation 207, data at a scratch unit corresponding to the current active unit is written the active unit in the active stripe.

At operation 208, unwritten data from the current partial stripe write is written to the active unit. Where operation 207 is reached, method 200 can prepend the scratch data for the active unit to the unwritten data from the current partial stripe write in memory. Subsequently, this aggregated data is written directly to the active unit of the active stripe. Where operation 207 is bypassed, operation 208 can write unwritten data to seal the active unit directly to the active stripe.

With the previously active unit now sealed and no longer active, method 200 determines at decision block 209 if all data units of the active stripe are sealed. If there are remaining unsealed units at the active stripe, a next active unit is allocated (e.g., by a volume manager) and decision block 212 is evaluated.

Where all units at the active stripe are sealed, operation 210 is reached following the evaluation at decision block 209. At operation 210, final parity(s) for the active stripe is written to the active stripe. The parity(s) is written to one or more parity disks for the active stripe. In one embodiment, final parity is first written to the scratch stripe before being written to its final position in the active stripe. This intermediary step of writing the final parity to the scratch stripe first is necessary where the active stripe contains scratch parity data, pursuant to some embodiments of operations 203 and 213. From the scratch stripe, the final parity(s) unit is fully written to the parity disk(s) of the active stripe.

With all data and parity units fully written, the active stripe is sealed at operation 211 and, effectively, is no longer the active stripe. This now-sealed stripe is fully written and is not overwritten until freed up by the container manager and volume manager. As a consequence, the container manager can allocate a next active container and the volume manager allocates the next active stripe for the active container. Similarly, the container manager can allocate and pair a next scratch container with the active container and the volume manager can map this allocation and pairing to a next scratch stripe.

In some embodiments, the write received at operation 202 is not a partial stripe write; rather, the write received is equal to or greater than a stripe size. In such a situation, the full stripe write is seals the active stripe as described and any remaining data is treated as a partial stripe write according to method 200 (e.g., by returning to operation 201 to allocate an active stripe and a paired scratch stripe and process the remaining data as the received partial stripe write at operation 202).

Returning to decision block 209, method 200 advances to decision block 212 where decision block 209 determines that the active stripe still comprises unwritten units. At decision block 212, method 200 determines if all data from the current partial stripe write has been written to the RAID storage system. Where the current partial stripe write seals the active unit (consequently, a next unit is active) and has remaining unwritten data, decision block 212 directs method 200 to decision block 203 to iterate through method 200 again until all data from the current partial stripe write is written to the RAID storage system. In some embodiments, these sub-iterations of method 200 can be done in parallel for a partial stripe write. For example, if a partial stripe write is received that contains enough data for three and one half units and there is data for one quarter of a first active unit at the scratch stripe, method 200 can prepend the scratch data to the current partial stripe write in memory and write the three units from memory to the first three units of the active stripe while writing, in parallel, the remaining three-quarters of data to the scratch stripe (where it can be subsequently written to the new active unit—now the fourth unit of the active stripe).

Where decision block 212 determines there is no remaining unwritten data at the partial stripe write, method 200 advances to operation 213. At operation 213, parity(s) is calculated for the data accumulated for the active stripe and written to the RAID storage system. This operation is analogous to operation 205, described above. Thus, the parity(s) can be written in parallel with the data from the partial stripe write. Finally, method 200 returns to operation 202.

According to some embodiments, the system and method adhere to some logic to recover from system and disk failures. For recovery purposes, a scratch stripe has two scratch units for its associated active stripe. Two scratch units are required so that the current on-disk image of an active stripe unit is not overwritten while the new image of the active stripe unit is transferred from memory to disk. Thus, the most recently written scratch unit is maintained, while the unwritten data is written to the other of the two scratch units (which can be either empty or contain obsolete data).

Similarly, a scratch stripe features two parity locations for parity of the active stripe. Importantly, the two parity locations at the scratch stripe are not necessarily two single units; rather, each of the two parity locations can span several units depending upon the RAID level of the RAID storage system. For example, for RAID 6 each of the two parity locations spans two units—one unit each for the P and Q parities—totaling four parity units at the scratch stripe. Likewise, the parity locations at the scratch stripe for RAID 5 span one unit each, thereby necessitating two dedicated units at the scratch stripe for parity. Analogous to writing regular data to the scratch stripe, the parity(s) is written alternately to the two parity locations at the scratch stripe (again, so that the current on-disk image of an active stripe parity is not overwritten while the new image of the active stripe parity is transferred from memory to disk). Thus, the most recently written parity unit(s) is maintained, while the parity for the active stripe data including the current partial stripe write is written to the other of the two parity locations (which can be either empty or contain obsolete parity). In totality, this system and method requires a RAID array featuring a minimum of four disks for a RAID 5 storage system and six disks for a RAID 6 storage system.

For an on-disk implementation of this system and method, two recovery rules should be observed: (1) no two versions of a stripe unit of an active stripe are placed on the same disk, and (2) the new image of a stripe unit never overwrites the current version on disk. In an embodiment of the system and method in which an active striped is paired with a scratch stripe from a different RAID array, the two rules can be implemented through the following logic. First, the sealed data and parity stripe units are written to their positions in the active (and regular) stripe. Second, the versions of an active unit are written to two scratch stripe units in alternating fashion. For a system with M data disks, these scratch data stripe units can be on data disks M−1 and M. For a system with K parity disks, the odd versions of active parity units can be written to the scratch stripe on parity disks 1 through K, while the even versions of active parity units can be written to the scratch stripe on data disks 1 through K. An example of this embodiment of system and method is shown at FIGS. 3A-3E. This illustrative embodiment can be performed by system 100 of FIG. 1 and/or method 200 of FIG. 2.

FIGS. 3A-3E illustrate an allocated active stripe 999 that has been paired with scratch stripe 1300. Active stripe 999 has been paired scratch stripe 1300, though scratch stripe 1300 is in a different array than active stripe 999. Here, both the RAID array containing active stripe 999 and the RAID array containing scratch stripe 1300 are RAID level 6 and feature ten disks: eight data disks (M equals 8) and two parity disks (K equals 2). At the RAID array containing active stripe 999, units 301-308 are located on data disks of the RAID array while units 309-310 are located on parity disks. Similarly, at the RAID array containing scratch stripe 1300, units 311-318 are located on data disks of the RAID array while units 319-320 are located on parity disks. In this embodiment, a stripe unit (e.g., 301) can hold 256 KB of data or parity; however, a stripe unit can be of any size. Consequently, active stripe 999 can hold two megabytes (MB) of data across the disks at units 301-308.

In the example illustrated at FIGS. 3A-3E, a series of partial stripe writes are received to be written to the allocated active stripe 999. At FIG. 3A, a first partial stripe write (not shown) of 384 KB of data is written to the RAID storage system. Because the size of data units 301-308 is 256 KB, the first partial stripe write results in one and one half fully written data units. The first data unit 301 is fully written at active stripe 999. Data and parity written to units is indicated in the figures by hatching. The remaining 128 KB of data from this remaining first partial stripe write is written to unit 317 at scratch stripe 1300. The P and Q parity stripe units calculated for the 384 KB of data for active stripe 999 are written to the scratch stripe at units 319 and 320, respectively. FIGS. 3A-3E additionally illustrate metadata as the 6-tuple <stripe type, stripe ID, stripe unit type, stripe unit order, stripe unit length, active stripe unit version> for data and parity written to the units of active stripe 999 and scratch stripe 1300. For example, scratch data unit 317 has the tuple <S, 999, D, 2, 128K, 1> indicating that unit 317 is the first version of a scratch unit for stripe 999 having 128 KB of data for the second unit.

Figure 3A:
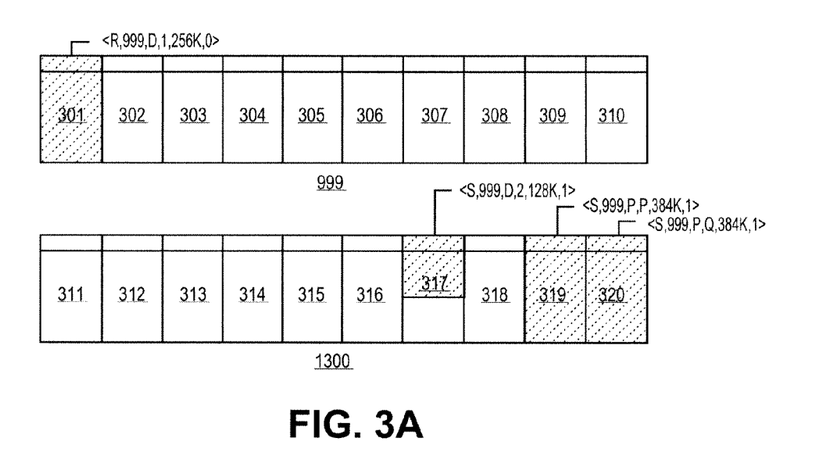
FIGS. 3A-3E are block diagrams illustrating one example of an embodiment of a method for handling partial stripe writes in a log-structured storage system.
Figure 3B:
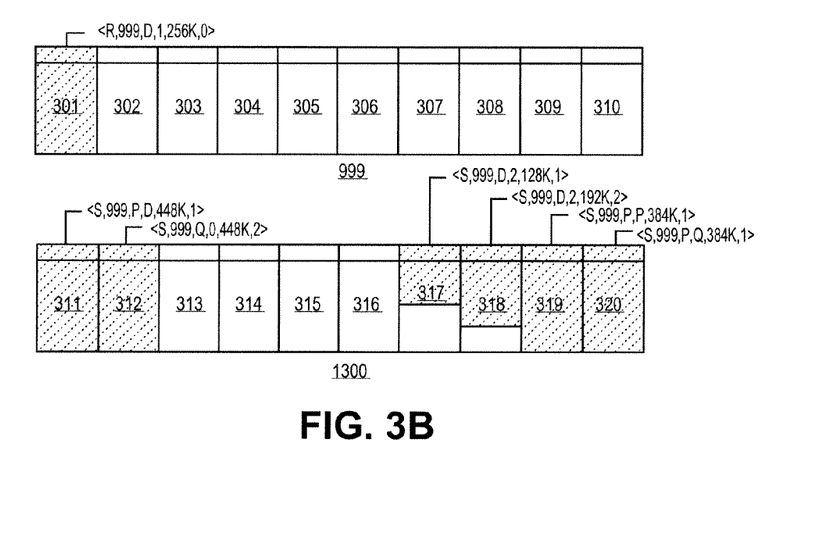

At FIG. 3B, a second partial stripe write (not shown) of 64 KB of data is written to the RAID storage system. This 64 KB of data is not sufficient to seal the active unit 302 of FIG. 3B when aggregated with the version of active unit 302 written at scratch unit 317 of scratch stripe 1300. Therefore, the 64 KB of data is written with the 128 KB of data (totaling 192 KB) to the second scratch unit 318 as the second version of the active unit 302. Additionally, new P and Q parity values are calculated for the active stripe and are written to the second location (i.e., units 311-312) for parities at scratch stripe 1300. The data write and parity write can be done in parallel.

Figure 3C:
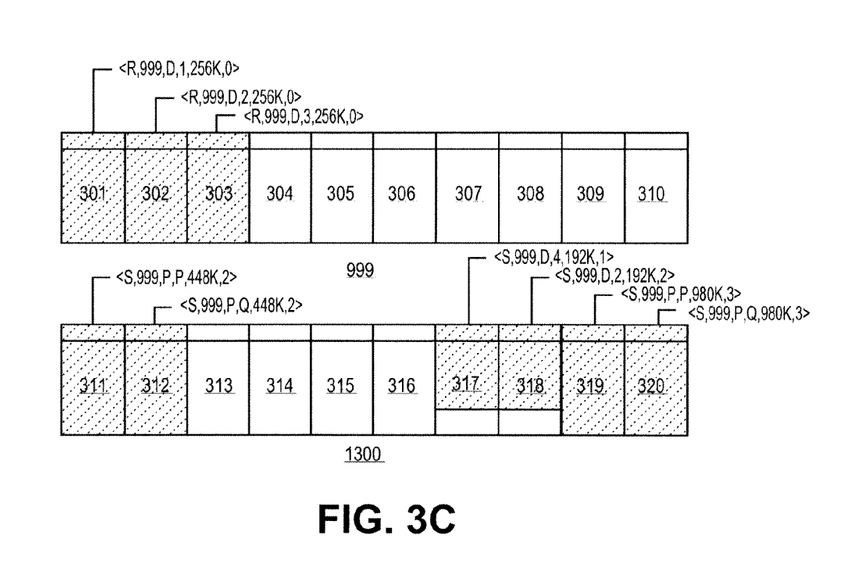

At FIG. 3C, a third partial stripe write (not shown) of 512 KB of data is written to the RAID storage system. This third write seals the active unit 302 (so it is no longer active) and the following unit 303. In one embodiment, the latest version of active unit 302 (i.e., data at second scratch unit 318) is prepended to data from the third stripe write (e.g., in memory) and written to active unit 302. Subsequently, the next 256 KB of data from the third scratch stripe is written to unit 303 (n.b., this write can be done in parallel). After writing full units to the active stripe, 192 KB of the 512 KB from the third partial stripe write remains to be written in the RAID storage system. This remaining 192 KB is written to the first scratch unit 317 as the first version of the new active unit 304. Again, this scratch write of 192 KB can be done in parallel.

Additionally at FIG. 3C, parities P and Q are calculated for the aggregated 960 KB of data for active stripe 999. The P and Q parities are written to parity units 319 and 320. Writing the parities to units 319 and 320 overwrites the obsolete parities calculated for data from the first stripe write (shown at FIG. 3A), but maintains the previous parities for data from the first and second stripe writes at units 311 and 312 for recovery purposes. As with all parity writes, this write can be done in parallel with writing the regular data.

Figure 3D:
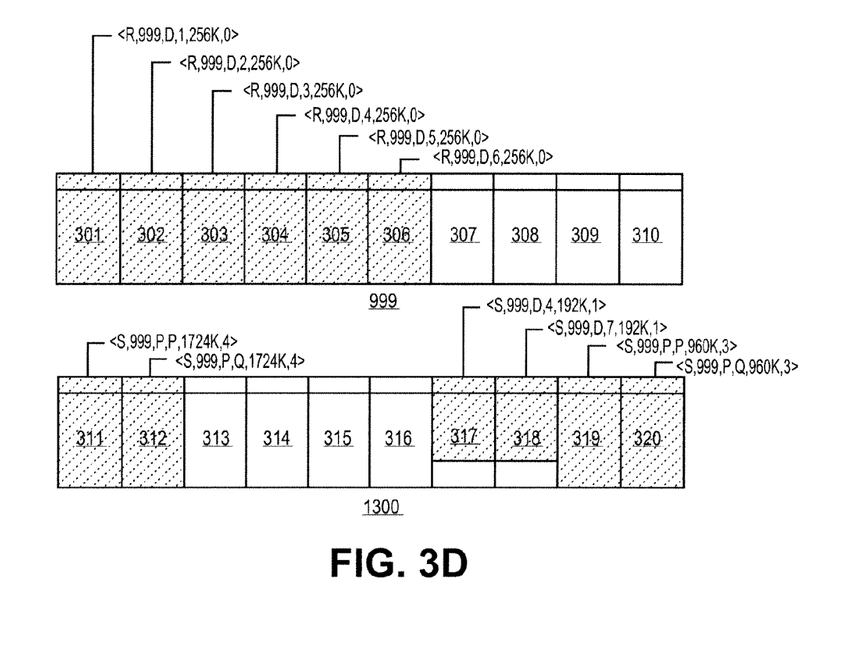

At FIG. 3D, a fourth partial stripe write (not shown) of 764 KB of data is written to the RAID storage system. This fourth write seals the active unit 304 (so it is not longer active) and the following units 305 and 306. Like the third partial stripe write shown at FIG. 3C, the latest version of active unit 304 (i.e., data at first scratch unit 317) can be prepended to data from the fourth stripe write (e.g., in memory) and written to active unit 304. After writing full units to the active stripe, 192 KB of the 764 KB from the fourth partial stripe write remains to be written in the RAID storage system. This remaining 192 KB is written to the second scratch unit 318 as the first version of the new active unit 307. Of course, parities are calculated for the accumulated data for active stripe 999. The parities are written to parity units 311 and 312.

Figure 3E:
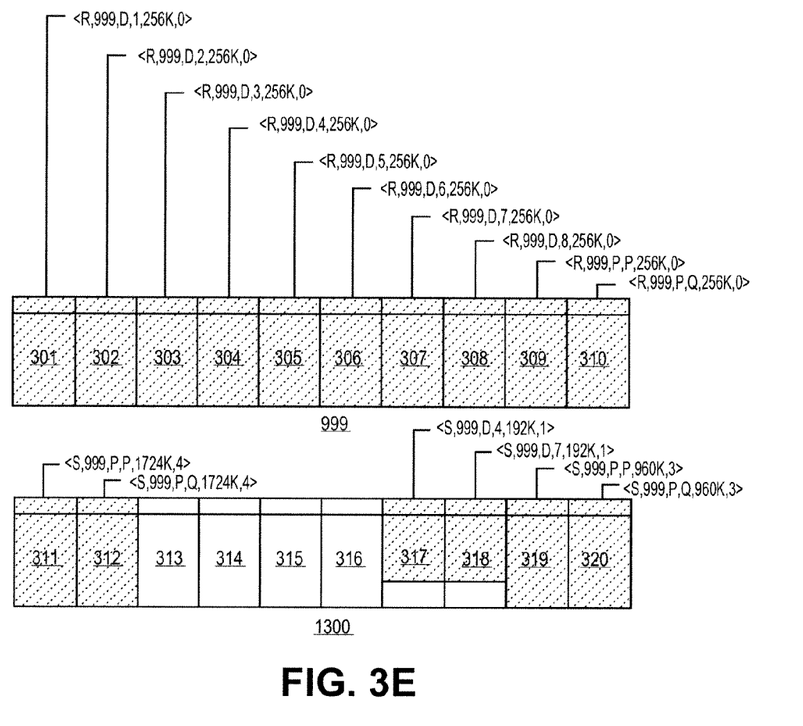

Finally, a fifth partial stripe write (not shown) of 324 KB of data is written to the RAID storage system at FIG. 3E. This final write seals the active unit 307 and the final data unit 308 of active stripe 999. Consequently, the final parities P and Q are calculated and written to the parity units 309 and 310 of active stripe 999. With all data units 301-308 and all parity units 309-310 of active stripe 999 written, active stripe 999 is now sealed and ceases to be active. At this point, scratch stripe 1300 can be released. In some embodiments, a volume manager allocates a new active stripe and pairs it with a new allocated scratch stripe.

For a RAID storage system with a single array or with no coordination layer or communication channel among RAID arrays, an allocated scratch stripe is paired with an active stripe in the same array and, consequently, additional recovery logic is implemented so that the two recovery rules are observed. In an embodiment of the system and method, a RAID array from which both the active stripe and the scratch stripe are allocated can feature M data disks and K parity disks. Initially, the first M−1 sealed data units are written to their positions in the regular, active stripe. However, data for the Mth sealed data stripe unit is written to its position on the active stripe only if the position does not include the previous image of this stripe unit. If the position does comprise the previous image of the Mth data stripe unit, this unit is written to the paired scratch stripe on the Mth data disk. Once the scratch stripe write is complete, this Mth stripe unit is written from the scratch stripe to its location on the active stripe. The versions of active data stripe units having an order less than M are alternately written to the scratch stripe on data disks M−1 and M. The odd-numbered versions of parity units for an active stripe are written to the scratch stripe on the parity disks 1 through K, while the even-numbered versions of parity units for the active stripe are written to the scratch stripe on the subset of data disks 1 through M−2. The subset 1 through M−2 is the set of disks that do not receive sealed stripe units from the current partial stripe write operation. If the number of disks in the subset 1 through M−2 is less than K, then the remaining parity stripe unit updates are made to the corresponding parity stripe units of the regular stripe on the parity disks 1 through K. Finally, a sealed parity stripe unit is written to its location on the regular stripe if the location does not contain the previous image of this stripe unit. Otherwise, it is written to the scratch stripe. When the scratch stripe write is completed, the parity stripe unit is written to its location on the regular stripe.

This logic for a single RAID array allows recovering partial stripe writes from multiple disk failures and both copies of the parity stripe units can be used for recovery. For example, in a RAID 6 storage system having eight data disks and two parity disks, the first version of the active parity stripe units are written to the scratch stripe on parity disks 1 and 2 and the second version of the active parity stripe units are written to the scratch stripe on the data disks 1 and 2. The active stripe can hold data for two sealed data units also on data disks 1 and 2. If both data disks 1 and 2 fail, then consequently the two sealed data units and the latest version of the active stripe parity units will fail. For recovery, the data stripe units are recovered using the first version of the parity units on parity disks 1 and 2 and the most recent version of the parity stripe units are recalculated using the sealed data stripe units and the most recent version of the active data stripe unit. An example of this embodiment of the system and method is shown at FIGS. 4A-4C.

FIGS. 4A-4C illustrate an allocated active stripe 1000 that has been paired with scratch stripe 1400, wherein both active stripe 1000 and paired scratch stripe 1400 are allocated from the same RAID array. Here, the RAID array containing the two stripes is RAID level 6 and features ten disks: eight data disks (M equals 8) and two parity disks (K equals 2). For active stripe 1000, units 401-408 are located on data disks of the RAID array while units 409-410 are located on parity disks. Similarly, scratch stripe 1400 features data units 411-418 that are located on the same respective data disks of the RAID array as active stripe data units 401-408, because both stripes are allocated from the same array. Consequently, scratch stripe units 419-420 are located on the same parity disks as parity units 409-410 of the active stripe. In this embodiment, a stripe unit holds 256 KB of data or parity.

In the example illustrated at FIGS. 4A-4C, a series of partial stripe writes are received to be written to the allocated active stripe 1000. At FIG. 4A, a first partial stripe write (not shown) of 64 KB of data is written to the RAID storage system. Because the size of data units 401-408 is 256 KB, the first partial stripe write is insufficient to seal the first active unit 401. Thus, the 64 KB of data from this first partial stripe write is written to unit first scratch unit 317 at scratch stripe 1400. The P and Q parity stripe units calculated for the 64 KB of data for active stripe 1000 are written to the scratch stripe at units 419 and 420, respectively.

At FIG. 4B, a second partial stripe write (not shown) of 1280 KB of data is written to the RAID storage system. This 1280 KB of data is sufficient to seal the active unit 401 of FIG. 4B as well as data units 402-405. Accordingly, the 64 KB of data for the active unit 401 at scratch unit 417 of the scratch stripe can be prepended to 192 KB of data from the second partial stripe write and written to unit 401. The next 1024 KB of data from the second partial stripe write is written to units 402-405 of active stripe 1000. The remaining 64 KB of data from the second partial stripe write is written to the scratch stripe at unit 418. The parity P unit for the accumulated data is written to unit 416 of the scratch stripe. However, the parity Q cannot be written to scratch stripe 1400. This parity Q is an even-numbered version (i.e., 2) of an active parity stripe unit so it is to be written to the subset of data disks 1-(M−2) that do not have sealed stripe units. At FIG. 4B, only unit 416 is available and the parity P has been written there. Thus, parity Q is written to the active stripe 1000 at unit 410, though it is identified as a scratch parity (e.g., by metadata written with the parity unit).

Finally, a third partial stripe write (not shown) of 704 KB of data is written to the RAID storage system at FIG. 4C. This final write seals the active unit 406 and the final data units 407-408 of active stripe 1000. Consequently, the final parity values P and Q are calculated and the P parity is written to unit 409 of the active stripe 1000. However, parity Q cannot be written to active stripe 1000 directly because parity unit 410 stores the previous version of parity Q (shown at FIG. 4B). For recovery purposes in case of disk failure, parity Q is first written to scratch stripe 1400 at unit 420. Subsequently, parity Q is written to active stripe 1000 at parity unit 410. With all data units 401-408 and all parity units 409-410 of active stripe 1000 written, active stripe 1000 is now sealed and ceases to be active. At this point, scratch stripe 1400 can be released.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A method for writing data to a redundant array of independent disks (RAID) with a parity system comprising:
    allocating a scratch stripe in the RAID system, the scratch stripe composed of scratch units;
    pairing the scratch stripe with an active stripe in the RAID system, the active stripe composed of data units including an active data unit and at least one parity unit;
    receiving a first partial stripe write and a second partial stripe write;
    sending a first scratch write to a first scratch unit of the scratch stripe, wherein the first scratch write includes first data of the first partial stripe write;
    sending a second scratch write to a second scratch unit of the scratch stripe, wherein the second scratch write includes the first data of the first partial stripe write and second data of the second partial stripe write.

2. The method of claim 1 wherein the scratch stripe is allocated from a same RAID array in the RAID system as the active stripe.

3. The method of claim 1 wherein the active stripe is at a first RAID array in the RAID system and further wherein the scratch stripe is not allocated from the first RAID array.

4. The method of claim 1, further co p sing:
    sending a first parity write to a first parity unit of the scratch stripe, wherein the first parity write includes parity data for the first partial stripe write.

5. The method of claim 4, further comprising:
    sending a second parity write to a second parity unit of the scratch stripe, wherein the second parity write includes parity data for the first partial stripe write and the second partial stripe write.

6. The method of claim 1, further comprising:
    receiving a third partial stripe write;
    sending an active write to the active unit of the active stripe, wherein the active write includes scratch data for the active unit at the scratch stripe and third data of the third partial stripe write.

7. The method of claim 1, further co sing:
    receiving a fourth partial stripe write;
    sending an active write to the active unit of the active stripe, wherein the active write includes fourth data of the fourth partial stripe write and further wherein the fourth data is at least of a predetermined unit size.

8. The method of claim 6, further comprising:
    releasing the scratch stripe and pairing the scratch stripe with a next active stripe, where the active stripe is sealed.

9. The method of claim 6 wherein each unit of the active stripe is sealed where a predetermined amount of data from the series of partial stripe writes approximately equal to the predetermined unit size is written to each unit of the active stripe.

10. A non-transitory computer-readable storage medium having instructions stored therein, which when executed by a computer, cause the computer to perform a method, the method comprising:
    allocating a scratch stripe in the RAID system, the scratch stripe composed of scratch units;
    pairing the scratch stripe with an active stripe in the RAID system, the active stripe composed of data units including an active data unit and at least one parity unit;
    receiving a first partial stripe write and a second partial stripe write;
    sending a first scratch write to a first scratch unit of the scratch stripe, wherein the first scratch write includes first data of the first partial stripe write;
    sending a second scratch write to a second scratch unit of the scratch stripe, wherein the second scratch write includes the first data of the first partial stripe write and second data of the second partial stripe write.

11. A redundant array of independent disks (RAID) array controller, comprising:
    a write reception module, to be executed by a processor, to receive a first partial stripe write and a second partial stripe write to be written to an active stripe in a first RAID array managed by the array controller;
    a container manager, to allocate a scratch stripe and pair the scratch stripe with the active stripe, wherein each of the scratch stripe and the active stripe are comprised of units;
    a scratch write module communicatively coupled with the write reception module and the container manager, to write first data of the first partial stripe write to a first location of the scratch stripe and to write the first data and second data of the second partial stripe to a second location of the scratch stripe; and
    a parity write module communicatively coupled with the write reception module and the container manager, to write parity data for the active stripe to one of the active stripe and the scratch stripe.

12. The RAID array controller of claim 11 wherein the container manager allocates the scratch stripe from one of the same RAID array that holds the active stripe and a RAID array that does not hold the active stripe.

13. The RAID array controller of claim 11 wherein the parity write module is to write a first parity write to a first parity unit of the scratch stripe, wherein the first parity write includes parity data for the first partial stripe write.

14. The RAID array controller of claim 13 wherein the parity module is to write a second parity write to a second parity unit of the scratch stripe, wherein the second parity write includes parity data for the first partial stripe write and the second partial stripe write.

15. The RAID array controller of claim 11 further comprising:
- an active write module, to write third data from a third partial stripe write received by the write reception module to an active unit of the active stripe, wherein the write includes scratch data for the active unit at the scratch stripe and the third data.

* * * * *